J. L. CREVELING.
STEAM TRAP.
APPLICATION FILED MAY 28, 1908.
1,094,883.
Patented Apr. 28, 1914.
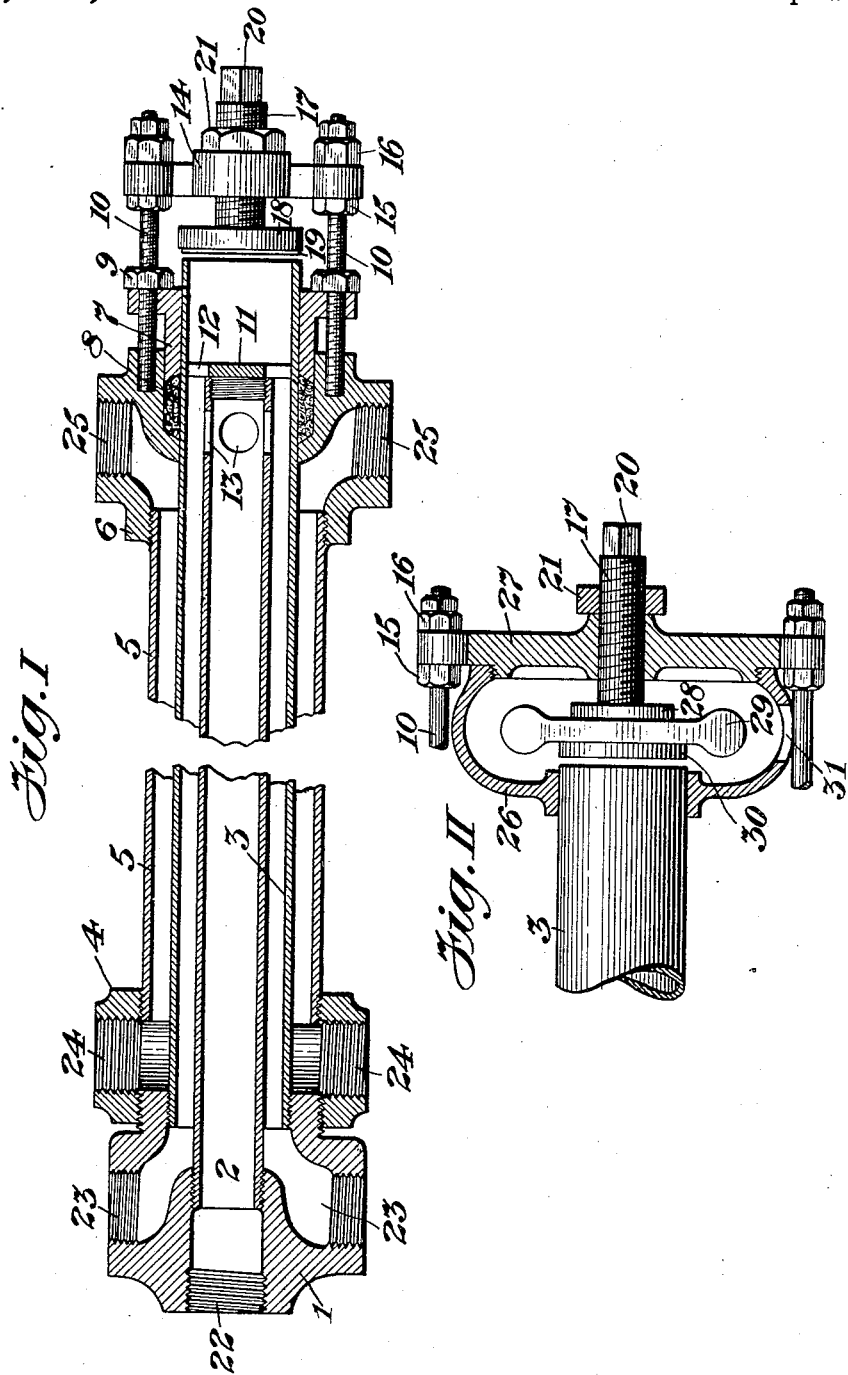

UNITED STATES PATENT OFFICE.

JOHN L. CREVELING, OF NEW YORK, N. Y., ASSIGNOR, BY MESNE ASSIGNMENTS, TO STANDARD HEAT AND VENTILATION COMPANY, INC., OF NEW YORK, N. Y., A CORPORATION OF NEW YORK.

STEAM-TRAP.

1,094,883.  Specification of Letters Patent.  Patented Apr. 28, 1914.

Application filed May 28, 1908. Serial No. 435,378.

*To all whom it may concern:*

Be it known that I, JOHN L. CREVELING, a resident of New York, in the county and State of New York, have invented a certain new and useful Improvement in Steam-Traps, as set forth in the following specification and drawing, forming a part thereof.

My invention pertains to that class of devices known as steam traps designed to drain off the water of condensation from steam pipes usually used in heating or steam transferring systems and has for its particular object to provide means whereby a certain part of the devices normally used in steam systems may be used in part to perform this function as will hereinafter more clearly appear.

Referring to the drawing Figure I represents one form of my invention in which a steam heating device known as a jacket is so designed as to fulfil its usual function and also that of a trap embodying my invention. Fig. II represents a modification of the jacket and trap shown in Fig. I comprehending my invention.

In Fig. I (1) represents a casting or header into which are screwed a pipe or tube (2) and a pipe 3 concentric therewith. Upon the male portion of the header (1) is screwed the female member (4) into which is threaded the pipe (5) the other end of which is screwed into the header or casting (6) adapted to receive the gland (7) and make a tight joint between the pipe (3) and itself as by packing indicated at (8) which may be drawn up as by nuts (9) upon the screw rods (10). The tube (2) is supported within the pipe (3) as by a plug (11) provided with a perforated flange (12) and the interior of the pipe (2) communicates with the interior of pipe (3) through the openings (13). The screw rods (10) carry the yoke (14) adjustable thereon as by means of nuts (15) and (16). This yoke carries a screw (17) with the expanded portion or flange (18) provided with the yielding disk (19) adapted to shut against the end of pipe (3) so as to close its end. The screw (17) may be adjusted as by means of the squared head (20) and can be held in position by lock nut (21).

The header (1) is provided with a steam inlet port (22) communicating with the interior of pipe (2) and steam outlet ports (23) communicating with the interior of pipe (3). The header (6) is provided with inlet ports (25) communicating with the interior of pipe (5) while the member (4) communicating with the interior of pipe (5) is provided with outlet ports (24).

In Fig. II the rods (10) carry the yoke (27) to which is attached the shell (26) which slips over the end of the pipe (3) and is free to move thereon. The screw (17) carries the flange (28) upon which is mounted an ordinary expansion disk (29) the opposite face of which is provided with a seat (30) which may close against the pipe (3) so as to prevent communication from the interior thereof to the atmosphere.

(31) represents an opening whereby any condensation coming from the pipe (3) may be drained away in any desired manner.

The expansion disk (29) may be made of a shell of light spring metal and partly filled with some volatile liquid as indicated.

The operation of my improved steam trap is substantially as follows: If steam be admitted through port (22) it will flow through pipe (2) openings (13) into pipe (3) and thence out through ports (23) thus heating the water or other circulating medium which may be arranged to enter through ports 25 and pass through pipe (5) and out through ports (24) in a well known manner. Now, if pipe (3) be made of a metal having a greater amount of expansion per unit of increase in temperature than pipe (5) as for instance, if pipe (3) be made of brass and pipe (5) made of iron, by proper adjustment of the screw (17) the seat or disk (19) may be brought in such relation with the end of pipe (3) that it will close the end of pipe (3) when the said pipe is filled with steam and open the end to the atmosphere as soon as the said pipe has collected an appreciable amount of water of condensation.

The head end of the jacket should be so elevated above the trap that pipe (3) may readily be kept free from water at all times. It will be obvious that the circulating medium can be kept from leaking around pipe (3) by proper adjustment of the gland (7). The same operation will take place in the modified form shown in Fig. II save that the expansion disk (29) can be made to coöperate with the expansion pipe (3) so as to afford quite a wide opening between the pipe and the seat (30) which will be caused to close by the joint effect of the expansion of the pipe (3) and of the disk (29) due to whatever steam may escape into the inside of the shell (26) so as to heat the said member (29).

I do not wish in any way to limit myself to any of the exact constructions or details shown in the attached drawing which are mere diagrammatic representations of forms of devices embodying the essentials of my invention and it is quite obvious that wide departure in form of construction may be taken without departing from the scope of my invention.

Having thus described my invention what I consider novel and desire to protect by Letters Patent is as set forth in the following claims:

1. A trap comprehending a tube for conveying liquid; a second tube within the first tube whereby a heating medium in the second tube can be utilized to heat the liquid in the first tube and means coöperating with the second tube so that the heating medium governs direct communication of the second tube with the atmosphere, the trap having no communication between the interior of the tube for conveying the liquid and the interior of the second tube.

2. A combined jacket and trap comprehending fluid conducting means adapted to contain a circulatory medium; means within the same for imparting heat thereto; in combination with means whereby the expansion of said heat imparting means governs communication of the same with the atmosphere, the combined jacket and trap having no communication between the fluid conducting means and the heating means.

3. A steam trap comprising a steam conveying expansion member; fluid conducting means in operative relation thereto; and means whereby expansive action of the expansion member governs the communication of the expansion member with the atmosphere, there being no direct communication between the steam conveying member and the fluid conducting means.

4. A combined jacket and trap comprising an outer tube adapted to contain a circulating medium; a tube within the same adapted to convey steam in operative relation to and separated from the circulating medium; and means whereby expansion of the steam conveying tube controls the drainage of the same.

5. A steam trap comprehending a conduit adapted to carry steam under pressure; combined with means whereby water of condensation is discharged from said conduit; means for utilizing heat of said steam while in transit through said conduit, comprising means for conducting a circulating medium in operative relation to said conduit; and means for controlling communication of the conduit with the atmosphere.

6. A steam trap comprehending a tube for conveying liquid; a second tube, concentric with the first tube, for conveying steam whereby the steam can be utilized to heat the liquid within the first tube; and means, comprising an expansible thermostatic member, coöperating with the second tube whereby the condensation from the steam can be discharged from the second tube, dependent upon the thermostatic conditions within said second tube, without permitting a flow from the opening controlled by said expansible thermostatic means to the interior of said tube for conveying the liquid.

7. A combined jacket and trap comprehending fluid conducting means adapted to contain a circulatory medium; means in operative relation thereto for imparting heat to a circulatory medium; combined with valve means constructed so that the expansion of said heat imparting means governs the drainage of the same.

8. A steam trap comprising an expansion member adapted to convey steam; fluid conducting means in operative relation thereto but not in communication therewith; and means whereby expansive action of the expansion member governs the drainage of the same.

9. A steam trap comprising an expansion member adapted to convey steam; fluid conducting means in operative relation thereto but not in communication therewith; means whereby expansive action of the expansion member tends to govern the drainage of the same; and a supplemental expansion member coöperating therewith.

10. Means for utilizing energy derived from a heated fluid comprising means for conveying said fluid; means for conveying another fluid in operative relation to but not communicating with the first named fluid; and means whereby the expansion of the means for conveying the first named fluid controls the drainage of said fluid conveying means.

11. In combination, a jacket for conducting fluid to be heated; means for heating the fluid including an expansion element; and valve means constructed so that the expansion of said element will control the drainage thereof and its communication with the atmosphere without permitting any flow, through the drainage opening, from the jacket to the heating means or vice versa.

12. In combination, a jacket for conducting fluid to be heated; means for heating the fluid including a duplex conduit; and means for controlling communication of said conduit with the atmosphere, there being no communication between the jacket and the heating means through the opening leading from the conduit to the atmosphere.

JOHN L. CREVELING.

Witnesses:
C. J. STOCKLEY,
E. E. ALLBEE.

Copies of this patent may be obtained for five cents each, by addressing the "Commissioner of Patents, Washington, D. C."